United States Patent [19]
Streuber

[11] Patent Number: 5,725,020
[45] Date of Patent: Mar. 10, 1998

[54] RUNOFF TONGUE FOR FLUID FLOW DIVIDER

[75] Inventor: Hans-Peter Streuber, Solingen, Germany

[73] Assignee: Julius Montz GmbH, Hilden, Germany

[21] Appl. No.: 674,706

[22] Filed: Jul. 8, 1996

[30] Foreign Application Priority Data

Jul. 7, 1995 [DE] Germany .................. 195 24 774.4

[51] Int. Cl.$^6$ .................. F15B 1/00; B05B 1/36
[52] U.S. Cl. .................. 137/561 A; 239/193; 261/97; 261/DIG. 44
[58] Field of Search .................. 261/97, DIG. 44; 239/193; 137/561 A

[56] References Cited

U.S. PATENT DOCUMENTS

| | | | |
|---|---|---|---|
| 4,267,978 | 5/1981 | Manteufel | 137/561 A |
| 4,479,909 | 10/1984 | Streuber | 261/97 |

FOREIGN PATENT DOCUMENTS

| | | |
|---|---|---|
| 0 282 753 A1 | 9/1988 | European Pat. Off. . |
| 1 465 022 | 11/1966 | France . |
| 30 13 782 A1 | 10/1981 | Germany . |
| 42 26 177 A1 | 2/1994 | Germany . |

*Primary Examiner*—A. Michael Chambers
*Attorney, Agent, or Firm*—Milton Oliver; Ware, Fressola, Van Der Sluys & Adolphson LLP

[57] ABSTRACT

Packed columns generate fluid flows which must be evenly divided, preferably over a broad range of fluid flow volumes. Runoff tongues are used to divide and distribute such flows. According to the present invention, each runoff tongue (2) is bifurcated in its lower portion to define two dripoff points (5). Mounted parallel to each bifurcated portion is a guide element (6), preferably of woven or perforated material. Each guide element is associated with a particular fluid outlet opening (3) in an end wall (1). An upper portion (6a) of the guide element extends through the opening (3) in end wall (1) into a fluid-containing zone whose bottom is defined by a seal (4). Preferably, at low-fluid-height states (H1), the guide element feeds fluid through the opening (3) by capillary action, while at high-fluid-height states (H2), direct overflow occurs. In a preferred embodiment, each guide element is semi-cylindrical and contacts the end wall (1) along a laterally central portion (6b) and defines wedge-shaped channels (9) between itself and the wall, which channels (9) serve to reliably conduct fluid to the dripoff points (5).

16 Claims, 1 Drawing Sheet

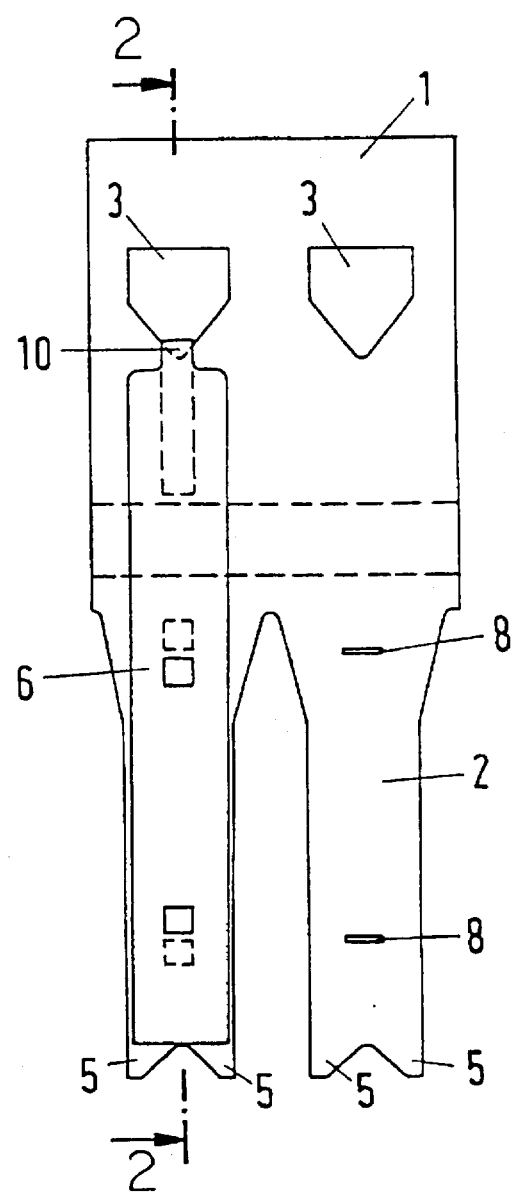
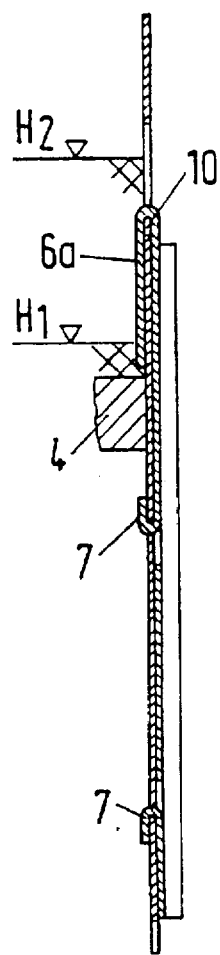
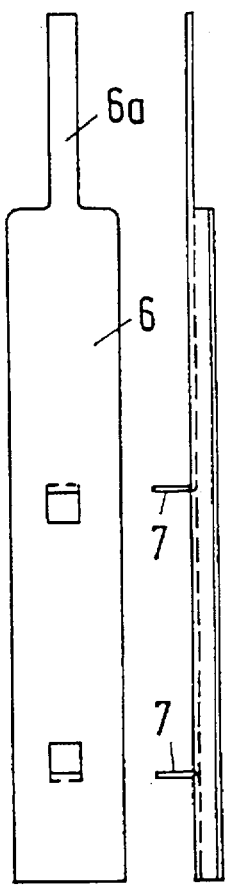
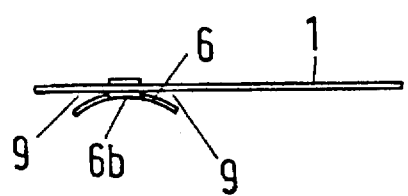
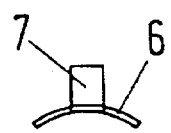

RUNOFF TONGUE FOR FLUID FLOW DIVIDER

FIELD OF THE INVENTION

The present invention relates to a runoff tongue with thereover-arranged fluid outlet opening, which has in its lower portion a narrowed form, preferably at the end divider walls of distributor devices. Such tongues are used in connection with absorption or transfer columns in chemical laboratories.

BACKGROUND

Runoff tongues for fluid dividers are known, for example from my German published patent applications DE 31 41 930 (corresponding to U.S. Pat. No. 4,479,909, Oct. 30, 1984), DE 33 06 636, DE 34 09 524 and DE 42 26 177. Each runoff tongue is thus associated with a respective fluid outlet opening above. These fluid outlet openings can be, depending upon the fluid loading, of differing size and form. The runoff tongue serves to distribute the fluid evenly among the exchange segments of heat- and material exhange columns. In this connection, it is important that the fluid remains on the runoff tongue in the course of dripping off or flowing off, and does not become diverted.

Very small quantities of fluid are directed, in accordance with the above-identified documents, with the aid of capillary wires from the outlet openings onto the runoff tongue. Greater quantities of fluid flow out of the outlet openings directly onto the runoff tongues. In my DE 34 09 524, issued Sep. 5, 1985, it is proposed, for improvement of the fluid guidance, to provide guide flanges in the upper portion of the runoff tongues or channels. The formation of the runoff tongues and of the fluid outlet opening must be matched to the fluid loading of the distribution surface.

It is an object of the invention, to provide a simply constructed and easy-to-assemble and easy-to-mount runoff tongue, having an associated fluid outlet opening, which assures a desired dripping off or run off of the fluid over a wide range of loading. Further, the number of drip off or run off points per fluid outlet opening should be doubled.

This object is achieved by providing, on the runoff tongue, a specially curved surface guide element, which at least in its middle region contacts the end distribution wall and which extends parallel to the runoff tongue.

The surface guide element achieves an optimal equalization and distribution of the incident fluid not only given large- and medium-sized fluid flows, but also at very small fluid flows, so that the result is always an equally divided flowoff or dripoff.

The number of dripoff points is doubled, if the runoff tongue is formed at its lower end with two dripoff points. The greater number of dripoff points are supplied very equally with fluid, since the guide elements achieve an optimal equalization and distribution of the fluid. In this connection, it is advantageous if the guide element runs continuously from the fluid outlet opening through to the dripoff points.

Preferably, the guide element, in its upper portion, is reduced in width to somewhere in the range of ¼ to ½ the width of its lower portion, especially to ⅓ the width. The guide element is fed through the fluid outlet opening 3 into the fluid zone behind, and into contact with the end wall. This assures that the fluid will pass early and evenly through the fluid outlet opening. This can be still further improved by making the upper portion of the guide element extend to the bottom of the fluid zone and along the end wall.

An optimal fluid feeding, with very good distribution, is achieved if the guide element comprises fine-mesh wire or plastic cloth, narrow-mesh expanded metal or perforated sheet metal or perforated plastic foil. The feeding sheet can be spotwelded or soldered in place. A very simple manufacture and assembly is achieved if the guide element is connected releasibly to the runoff tongue by means of tabs in slots.

It is preferable, that the fluid outlet opening have, in its lower portion, a narrowed form. It is also advantageous for the generating line of the part-cylindrical curved guide element to lie in the flow direction of the fluid, since this forms longitudinal gaps or channels between tongue and guide element, which channels reliably pick up and conduct the fluid.

BRIEF FIGURE DESCRIPTION

FIG. 1A shows a portion of an end divider wall of a distributing surface with two runoff tongues, of which one is provided with a guide element;

FIG. 1B is an end view looking longitudinally along the guide element of FIG. 1;

FIG. 2 is a section along line II—II of FIG. 1;

FIG. 3A is a plan view of a guide element;

FIG. 3B is a side view thereof, showing sidewise tabs;

FIG. 3C is an end view, showing tabs prior to crimping.

DETAILED DESCRIPTION

The end distributor walls 1 of a channel divider are provided with runoff tongues 2, with which are associated fluid outlet openings 3, which in their lower region have a triangular form. The runoff tongues are located below the fluid seal 4 of the distributor, and each have two dripoff points 5. On the runoff tongues 2 are respective curved guide elements or troughs 5 which contact the end divider wall 1 only in their middle regions, and which extend upward to the fluid outlet openings 3. In their upper portions 6a, the guide elements are reduced in width to about ½ to ¼, preferably ⅓, of the width of their lower portions. The reduced-width portion 6a is fed through the fluid outlet opening 3, as shown at 10 in FIGS. 1 & 2, at the lower triangular region into the fluid-flow zone behind to the base thereof, and bent to rest against wall 1. The guide elements 6 can be connected to the runoff tongues, permanently by spotwelding, or releasibly by crimping of tabs 7 in slots 8.

The wedge spaces 9 thus formed, between the end walls 1 and the thus-mounted guide elements 8, define preferred fluid channels, which serve for an equalized impingement upon dripoff points 5.

The guide elements 6 are advantageously made of a fine-mesh wire cloth with capillary action. However, they can also be made of narrow-mesh expanded metal or perforated sheet metal or out of perforated plastic.

The runoff tongues with thus-mounted guide elements 6 are operative over a very large loading range. At a fluid state H1 (shown in FIG. 2), the fluid transport operates by capillary action within the region 6a of guide element 6. Before the capillary action starts, the fluid level rises initially into the lower region of the fluid outlet opening 3. The zone 10, enclosed by element 6a, makes easier the leap over the individual runoff tongues 2. The relatively large height difference, between fluid level H1 in the channels and the dripoff points 5, has a favorable effect on the fluid transport. With fluid loading rising to H2, a direct overflow occurs out of the fluid outlet openings 3. Hereby, the wedge-shaped channels 9 fill up immediately and conduct greater quantities of fluid reliably to the dripoff points 5.

The guide elements 6 may be made mechanically in a single working step and are simple to fasten. The doubling of the drip points reduces by half the number of runoff tongues needed and thus makes it possible to form them wider, and therefore more stable.

Various changes and modifications are possible within the scope of the inventive concept. Therefore, the invention is not limited to the particular embodiment shown and described, but rather is defined by the claims below.

What is claimed is:

1. A runoff tongue (2) for a channel distributor having an end wall (1) formed with a fluid outlet opening (3), wherein
said runoff tongue (2) is an extension of said end wall (1); and
a curved guide element (6) is mounted on said runoff tongue, runs parallel to a longitudinal axis of said tongue, and has a laterally central region (6b) which contacts said end wall (1), thereby defining wedge-shaped spaces (9) between said guide element (6) and said tongue (2) for channeling of fluid toward an end (5) of said tongue.

2. A runoff tongue according to claim 1, wherein said tongue has a lower end formed with two dripoff points (5).

3. A runoff tongue according to claim 2, wherein said guide element is generally semi-cylindrical, and a generating line thereof extends in a flow direction of fluid to be guided by said guide element.

4. A runoff tongue according to claim 2, wherein said guide element (6) extends continuously from said fluid outlet opening (3) to said dripoff points (5).

5. A runoff tongue according to claim 4, wherein said guide element is generally semi-cylindrical, and a generating line thereof extends in a flow direction of fluid to be guided by said guide element.

6. A runoff tongue according to claim 1, wherein said guide element (6) has a reduced-width upper portion (6a) which extends through from said fluid outlet opening (3) into a fluid zone beyond said end wall (1), and extends along a side surface of said fluid zone.

7. A runoff tongue according to claim 6, wherein said upper portion (6a) of said guide element extends to a bottom (4) of said fluid zone and is rests in said fluid zone against said end wall (1).

8. A runoff tongue according to claim 7, wherein said guide element is generally semi-cylindrical, and a generating line thereof extends in a flow direction of fluid to be guided by said guide element.

9. A runoff tongue according to claim 6, wherein said guide element is generally semi-cylindrical, and a generating line thereof extends in a flow direction of fluid to be guided by said guide element.

10. A runoff tongue according to claim 1, wherein said guide element is formed of a material selected from the group consisting of:

fine-mesh wire cloth, fine-mesh plastic cloth, narrow-mesh expanded metal, perforated sheet metal, and perforated plastic foil.

11. A runoff tongue according to claim 10, wherein said guide element is generally semi-cylindrical, and a generating line thereof extends in a flow direction of fluid to be guided by said guide element.

12. A runoff tongue according to claim 1, wherein said guide element is releasibly fastened to said tongue by means of tabs (7) which engage in slots (8).

13. A runoff tongue according to claim 12, wherein said guide element is generally semi-cylindrical, and a generating line thereof extends in a flow direction of fluid to be guided by said guide element.

14. A runoff tongue according to claim 1, wherein said fluid outlet opening (3) has a lower portion which is narrower than a remaining portion of said opening.

15. A runoff tongue according to claim 8, wherein said guide element is generally semi-cylindrical, and a generating line thereof extends in a flow direction of fluid to be guided by said guide element.

16. A runoff tongue according to claim 1, wherein said guide element is generally semi-cylindrical, and a generating line thereof extends in a flow direction of fluid to be guided by said guide element.

* * * * *